March 14, 1933.  K. H. KOLHEDE  1,901,521
ELECTRICAL VALVE CONTROL FOR PACKING MACHINES
Filed July 27, 1931   2 Sheets-Sheet 1
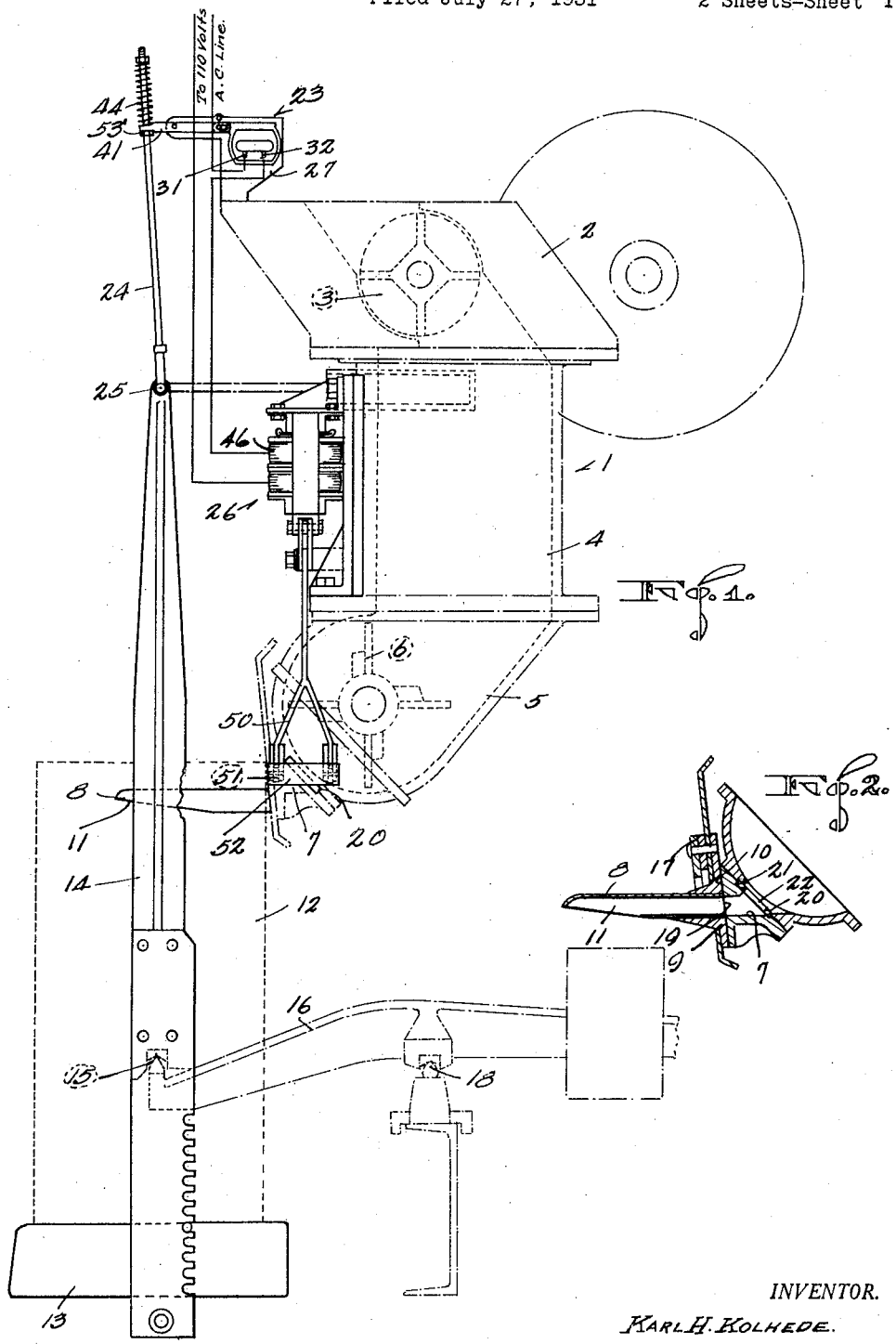
INVENTOR.
KARL H. KOLHEDE.
BY Munn & Co.
ATTORNEYS.

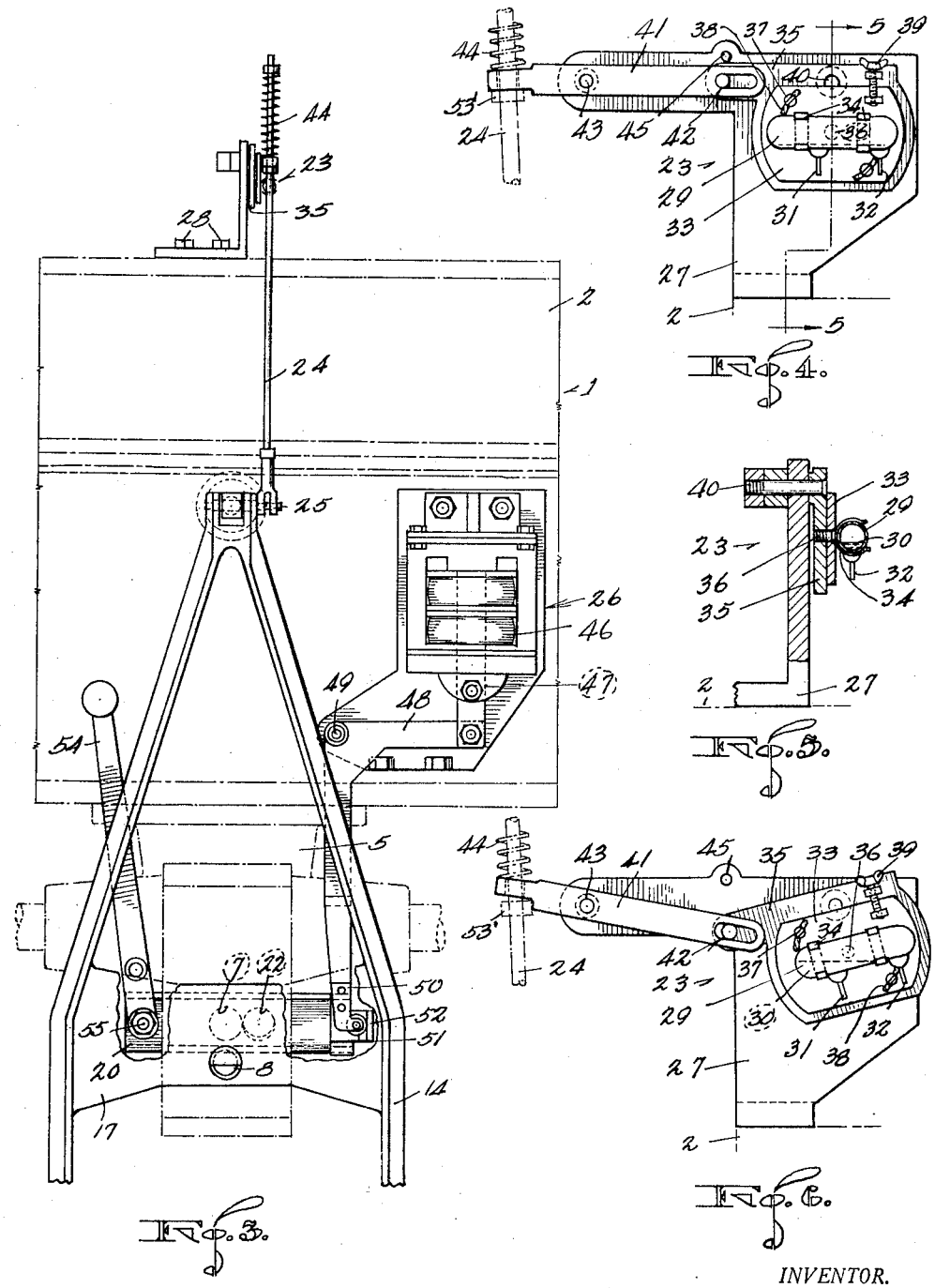

Patented Mar. 14, 1933

1,901,521

UNITED STATES PATENT OFFICE

KARL H. KOLHEDE, OF SAN ANDREAS, CALIFORNIA

ELECTRICAL VALVE CONTROL FOR PACKING MACHINES

Application filed July 27, 1931. Serial No. 553,471.

The present invention relates to improvements in valve controls for packing machines, and has particular reference to an electrically operated valve that is adapted to be closed after a predetermined weight of material has been dispensed from the packer.

Well known packing machines at the present time of the weight controlled classification employ a weighing scale that is associated with the feeding means for closing the latter in accordance with the weight of material which the operator desires to place in each bag. Difficulty, however, has been experienced in exactly gauging the amount of material dispensed after the valve closing operation begins, and thus the weight of the material is not always uniform.

An object of my invention is to provide means for automatically and instantaneously cutting off further feeding after the weighing scale beam begins to move due to the pressure exerted on the scales. The latter may be adjusted, and the bags will accordingly be uniform in weight.

It is particularly proposed to provide a solenoid actuated valve, which through the use of a mercury switch is energized for closing a feed-controlling valve after the predetermined weight has been reached. The solenoid is positive in action, and operates almost instantly for closing the valve.

I further propose to provide a mercury switch of novel construction that is particularly well adapted for use in connection with the solenoid.

The invention consists in the combinations, constructions and arrangements hereinafter described and claimed.

My invention is illustrated in the accompanying drawings forming a part of this application, in which:

Figure 1 is a side elevation disclosing the electrical valve mechanism as attached to a conventional packer with parts of the latter in depressed position;

Figure 2 is a sectional view through the impeller housing with the discharging spout in registry with the housing outlet;

Figure 3 is a front elevation of Figure 1;

Figure 4 is an enlarged view of the mercury switch in closed position;

Figure 5 is a vertical section taken along the line 5—5 of Figure 4; and

Figure 6 is a view showing the switch in open position.

In carrying out my invention, I make use of a packer 1 including a bin 2 having a feeding spider 3 arranged therein for feeding cement or other similar material into a hopper 4. The hopper in turn delivers the material to an impeller housing 5 in which an impeller 6 is arranged for moving the material through an outlet fixture 7.

A discharge spout 8 has a flange 9 arranged in abutting relation with the flat surface 10 of the outlet fixture with freedom of sliding motion therealong. Figure 2 shows the spout in raised position so as to register with the outlet 7 for allowing the material descending through the hopper to be discharged at 11 into a bag 12 for filling the latter.

It will be noted that the bottom of the bag rests on a basket 13 carried by a vertically movable yoke-shaped frame 14, which latter bears at 15 on a beam 16 forming part of a weighing scale mechanism.

In Figure 3, I show a bridging member 17 extending between the arms of the yoke and having the spout 8 secured thereto. As the bag is filled to its proper weight, the beam of the scale is rocked about its fulcrum 18. This action lowers the entire frame 14 and moves the spout into the position illustrated in Figure 1, whereby the spout is out of registry and prevents further feeding of material at 19.

When the bag is removed from the basket support, the frame 14 again returns to normal, that is, the spout is moved into registration with the outlet 7 for permitting another bag to be subsequently filled.

In addition to the valve arrangement provided between the spout and the impeller housing, a second valve 20 of the gate type is provided. Conventional packers utilize a manually operated valve for this purpose, and the same is closed by the attendant after the spout 8 has moved into its lowermost position so as to prevent feeding of material upon the reopening of the weight controlled valve due to the removal of the bag.

The foregoing method of closing the valves is very slow, and on account of the variation in the feeding speed, it is difficult to exactly gauge the amount of material that is fed after the frame 14 begins to descend, and the bags, therefore, are not uniform in weight even though a weighing scale is utilized as the primary controlling means. Moreover, there is a tendency for the beam to fluctuate before coming to rest, and material is discharging from the spout during this period.

The valve 20 is disclosed as being slidably mounted in a transverse guide 21 and formed with an opening 22 through which the material passes before entering the outlet 7. The spout opening is out of registration in Figure 3 relative to the outlet 7, and it should be understood that the two form a conduit when the yoke or frame 14 is released so as to allow the spout to assume its normal position.

The parts thus far described are well known in the art, and form no part of the present invention, except insofar as they cooperate with the parts now to be described. Although I have illustrated only part of the conventional packer, it will be appreciated that the remaining elements are employed, and that I have merely omitted them for the purpose of simplicity and clarity.

The present invention contemplates making the closing operation of the valve 20 automatic and substantially instantaneous with the initial downward movement of the frame 14 upon yielding of the beam scale. This result is accomplished by means of a mercury switch, or other suitable switch, that is actuated by a rod 24, which latter is pivoted to the frame at 25, and designed to close a circuit to a solenoid 26. The solenoid in turn closes the valve 20 for closing off the feeding means.

The mercury switch unit is supported by a bracket 27 projecting from the bin feeder casting and anchored to the latter by bolts 28 or the like. The switch consists in its structural features of a chamber 29 having a quantity of mercury confined therein for bridging across the terminals 31 and 32 upon moving the chamber into substantially horizontal position.

The mercury chamber is fixed to a backing plate 33 by yielding clips 34, and this plate in turn is pivoted to a second plate 35 as at 36. I have also provided means for adjusting one plate with respect to the other, and for this purpose I use screws 37 which pass through arcuate slots 38 in the outer plate and a micrometer adjustment designated by the numeral 39. The plate 35 is tiltably mounted on the bracket 27 at 40, and the plate is connected to a link 41 by a slot and pin arrangement indicated generally at 42. The link is pivoted at 43 to the bracket and has its free end apertured with an elongated slot adapted for receiving the rod 24. A spring 44 is arranged in encircling relation with the rod, and this allows an extra movement of the rod after the mercury switch has been rocked until the plate 35 strikes a positive stop 45.

The mercury chamber is normally disposed at a slight inclination with the mercury toward one end of the chamber when the frame 14 is raised. Figure 6 illustrates the switch in this position, and it will be noted that the link 41 and the plate 35 are arranged in an angular disposition relative to each other, and that the switch is opened.

As the frame 14 is lowered by the pressure of the bag and its contents against the scale beam, the mercury chamber is tilted to the position disclosed in Figure 4 by the rod 24. The terminals 31 and 32 are thus electrically connected, and the solenoid coils 46 are energized so as to actuate the plunger 47. The plunger movement, through a bell-crank lever 48 pivoted at 49, acts to close the valve 20, that is, the valve is moved into the position as occupied in Figure 3.

The free end of the lever 48 is fashioned with a forked end 50, and each arm thereof revolvably carries a roller 51 that in turn bears against a transverse plate 52 extending from the valve. When the solenoid is thus energized through the conventional wiring disclosed, the valve 20 is moved endwise almost instantly, and this takes place during the initial yielding of the scale beam 16. Material is thus prevented from discharging after the scale beam gives upon the exact weight of material being reached.

From the foregoing description of the various parts of the device, the operation thereof may be readily understood.

A bag is arranged over the discharge end of the spout 8 with its lower end accommodated on the basket 13. As soon as the predetermined weight is reached, the frame 14 begins to descend so as to cut off further flow of material at 19. During this closing operation of the weight valve, the mercury switch is also closed, resulting in sliding the gate or valve 20 until its opening is out of registration with the outlet 7.

The valve 20 then remains closed until it is manually opened by a crank 54 which is connected to the former at 55. As the rod 24 returns to its normal position the nut 53' carried on the rod returns the switch to opened position, and the cycle is again ready to start.

While I have shown only the preferred embodiment of my invention, it should be understood that various changes or modifications may be made within the scope of the annexed claims without departing from the spirit of the invention.

The valve and switch controlled mechanism associated therewith may be used on packers for cement, grain, sugar, flour, or the like, and will instantly stop the flow of material at a predetermined weight.

I claim:

1. An electrically controlled valve comprising a solenoid adapted for mounting on a packer including a discharge, said solenoid having a plunger, a valve mounted for closing the discharge and formed with an abutment plate thereon, a member connected to the plunger and having rollers bearing against the abutment plate, and means for energizing the solenoid for moving the valve into closed position.

2. In a packing machine, in combination, a hopper having an outlet port, a spout movable relative to the port for movement between registering and non-registering positions, a scale adapted to support a bag in receiving relation to the spout, means for moving the spout into a position of non-registry when the bag is filled to a predetermined weight, a valve in the port and means for instantaneously closing the valve during the initial movement of the spout whereby further feeding into the bag during the spout movement is prevented.

3. In a packing machine, in combination, a hopper having an outlet port, a spout movable relative to the port for movement between registering and non-registering positions, a scale adapted to support a bag in receiving relation to the spout, means associated with the scale for moving the spout into a position of non-registry when the bag is filled to a predetermined weight, a valve in the port and adjustable means for instantaneously closing the valve during the initial movement of the spout whereby further feeding into the bag during the spout movement is prevented.

4. In a packing machine, in combination, a hopper having an outlet port, a spout movable relative to the port for movement between registering and non-registering positions, a scale adapted to support a bag in receiving relation to the spout, means for moving the spout into a position of non-registry when the bag is filled to a predetermined weight, a slide valve in the port having an abutment outside the port, a lever having a roller contacting said abutment, an electric circuit including a solenoid having a plunger for operating the lever and means for closing the circuit during the initial movement of the spout whereby the valve is closed automatically and instantaneously.

5. In a packing machine, in combination, a hopper having an outlet port, a scale having a bag supporting basket and a frame rising in front of the machine, a spout supported by the frame and movable therewith for movement between positions of registry and non-registry with the port, a valve in said port having means for manipulating the same at one end and having an abutment at the other end, a circuit having a solenoid and a plunger therein, a lever adapted for actuation by the plunger having a roller bearing on the abutment for closing the valve when the solenoid becomes energized, a switch for closing the circuit and means associated with the frame for actuating the switch.

KARL H. KOLHEDE.